United States Patent
Simon et al.

(10) Patent No.: US 11,795,875 B2
(45) Date of Patent: Oct. 24, 2023

(54) OIL TRANSFER DEVICE

(71) Applicant: SAFRAN TRANSMISSION SYSTEMS, Colombes (FR)

(72) Inventors: Adrien Louis Simon, Moissy-Cramayel (FR); Patrice Jocelyn Francis Gedin, Moissy-Cramayel (FR); Bálint Pap, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 58 days.

(21) Appl. No.: 17/231,517

(22) Filed: Apr. 15, 2021

(65) Prior Publication Data

US 2021/0363922 A1 Nov. 25, 2021

(30) Foreign Application Priority Data

Apr. 16, 2020 (FR) ...................................... 2003823

(51) Int. Cl.
*F02C 7/06* (2006.01)
*F02C 7/36* (2006.01)
*F16H 57/04* (2010.01)

(52) U.S. Cl.
CPC .................. *F02C 7/06* (2013.01); *F02C 7/36* (2013.01); *F16H 57/0424* (2013.01);
(Continued)

(58) Field of Classification Search
CPC .. F02C 7/06; F02C 7/36; F16H 57/021; F16H 57/04; F16H 57/042; F16H 57/0421;
(Continued)

(56) References Cited

U.S. PATENT DOCUMENTS 8,246,503 B2 * 8/2012 Sheridan .................. F02C 7/36
184/6.12
2012/0088624 A1 4/2012 Sheridan
(Continued)

FOREIGN PATENT DOCUMENTS

CN 108700121 A 10/2018
CN 209892718 U 1/2020
(Continued)

OTHER PUBLICATIONS

French Preliminary Search Report and Written Opinion for French Application No. FR2003823, dated Jan. 15, 2021.

*Primary Examiner* — Loren C Edwards
(74) *Attorney, Agent, or Firm* — BIRCH, STEWART, KOLASCH & BIRCH, LLP

(57) ABSTRACT

The present invention relates to an oil transfer device (1) for lubricating a planet carrier, movable in rotation, of an epicyclic gear train for a turbomachine, the device (1) extending around an axis (A) and having:
an annular casing (11) which extends around the axis (A), the casing (11) comprising a plurality of oil feed grooves (14), axially juxtaposed, each having an oil ejection opening configured to lead radially to a lubrication circuit of the planet carrier to be lubricated,
the device (1) being characterized in that one of the oil feed grooves (14) is a high-pressure oil feed groove (14), called a high-pressure groove (14a), and another of the other oil feed grooves (14) is a low-pressure oil feed groove (14), called a low-pressure groove (14b), axially juxtaposed to the high-pressure groove (14a), the grooves (14) being arranged axially along the axis (X) so that the oil is able to be transferred axially from the high-pressure groove (14a) to the low-pressure groove (14b).

20 Claims, 5 Drawing Sheets

(52) U.S. Cl.
CPC ..... *F16H 57/0456* (2013.01); *F16H 57/0471* (2013.01); *F16H 57/0482* (2013.01); *F05D 2220/323* (2013.01); *F05D 2260/40311* (2013.01); *F05D 2260/98* (2013.01)

(58) Field of Classification Search
CPC ............. F16H 57/0424; F16H 57/0426; F16H 57/043; F16H 57/0456; F16H 57/0471; F16H 57/0479; F16H 57/0482; F16H 57/082; F05D 2220/323; F05D 2260/40311; F05D 2260/98
See application file for complete search history.

(56) References Cited

U.S. PATENT DOCUMENTS

2018/0306308 A1    10/2018    Uhkoetter et al.
2019/0040908 A1*    2/2019    Feraud ................ F16H 57/0482

FOREIGN PATENT DOCUMENTS

EP         3 330 573 A1    6/2016
FR         3 018 861 A1    9/2015

* cited by examiner

OIL TRANSFER DEVICE

FIELD OF THE INVENTION

The present invention relates to an oil transfer unit intended to transfer oil between a fixed portion and a rotating portion. In particular, the description that follows refers to an oil transfer unit intended to supply lubricating oil to a rotating planet carrier of an epicyclic transmission in a turbomachine.

PRIOR ART

Generally, the role of a mechanical reduction gear is to modify the speed ratio and the torque between an input shaft and an output shaft of a power transmission mechanism.

The new generations of double flow turbomachines, particularly those having a high bypass ratio, comprises a mechanical reduction gear for driving the shaft of a blower (also called a fan). Usually, the reduction gear has the purpose of transforming the rotation speed, considered fast, of the shaft of a power turbine into a slower rotation speed for the shaft driving the fan.

A reduction gear of this type comprises a central gear, called a sun gear, a ring gear and gears called planet gears, which are engaged between the sun gear and the ring gear. The planet gears are held by a frame called a planet carrier. The sun gear, the ring gear and the planet carrier are planetary gears because their axes of revolution coincide with the longitudinal axis X of the turbomachine. Each of the planet gears have a different axis of revolution distributed equally on the same diameter of operation around the axis of the planetary gears. These axes are parallel to the longitudinal axis X.

There exist several reduction gear architectures. In the prior art of double flow turbomachines, the reduction gears are of the planetary or epicyclic type. There exist architectures called differential or compound in other similar applications. Most generally, the three following architectures are distinguished:
  In a planetary reduction gear, the planet carrier is fixed and the ring gear constitutes the output shaft of the device which rotates in the opposite direction from the sun gear.
  In an epicyclic reduction gear, the ring gear is fixed and the planet carrier constitutes the output shaft of the device, which rotates in the same direction as the sun gear.
  In a differential reduction gear, no element is fixed in rotation. The ring gear rotates in the opposite direction to the sung gear and the planet carrier.

Reduction gears can be composed of one or more meshing stages. This meshing is provided in different manners, such as by contact, by friction or even by magnetic fields.

There exist several types of meshing by contact such as with straight or herringbone toothing.

FIG. 1 which describes a known turbomachine 1. The turbomachine 1 conventionally includes a fan S, a low-pressure compressor 1a, a high-pressure compressor 1b, a combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form, with it, a high-pressure spool (HP). The low-pressure compressor 1a and the low-pressure turbine 1e are connected by a low-pressure shaft 3 and form with it a low-pressure spool (BP).

The fan S is driven by a fan shaft 4 which is driven by the BP shaft 3 by means of a reduction gear 6. This reduction gear is generally of the planetary or epicyclic type.

Although the description that follows relates to a reduction gear of the planetary or epicyclic type, it also applies to a mechanical differential in which the three components, that are the planet carrier 10, the ring gear 9 and the sun gear 7, are movable in rotation, the speed of rotation of one of these components depending in particular on the difference in speed of the two other components.

The reduction gear 6 is positioned in the upstream portion of the turbomachine. A fixed structure including, schematically, here, an upstream portion 5a and the downstream portion 5b which compose the engine casing or stator 5 is arranged so as to form an enclosure E surrounding the reduction gear 6. This enclosure E is formed upstream here by seals at a bearing allowing the crossing of the fan shaft 4, and downstream by seals at the crossing of the BP shaft 3.

FIG. 2 describes a reduction gear 6 which can take the form of different architectures depending on whether certain parts are fixed in rotation. At the input, the reduction gear 6 is linked to the BP shaft 3, for example by means of splines 7a. Thus, the BP shaft 3 drives a planetary gear called the sun gear 7. Conventionally, the sun gear 7, the axis of rotation of which coincides with that of the turbomachine X, drives a series of gears called planet gears 8, which are evenly distributed on the same diameter around the axis of rotation X. This diameter is equal to twice the center distance between the operating axes of the sun gear and the planet gears 8. The number of planet gears 8 is generally defined between three and seven for this type of application.

The set of planet gears 8 is held by a frame called the planet carrier 10. Each planet gear 8 rotates around its own axis Y, and meshes with the ring gear 9.

At the output, the architecture is the following:
  In an epicyclic configuration, the set of planet gears 8 drives in rotation the satellite carrier 10 around the axis X of the turbomachine. The ring gear is fastened to the engine casing or stator 5 by a ring gear carrier 12 and the planet carrier 10 is fastened to the fan shaft 4.
  In a planetary configuration, the set of planet gears 8 is held by a planet carrier 10 which is fastened to the engine casing or stator 5. Each planet gear drives the ring gear which is applied to the fan 4 via a ring gear carrier 12.

Each planet gear 8 is mounted free in rotation by means of a bearing 11, for example of the rolling element or hydrostatic bearing type. Each bearing 11 is mounted on one of the axes 10b of the planet carrier 10 and all the axes are positioned relative to one another by means of one or more structural frames 10a of the planet carrier 10. There exists a number of axes and of bearings equal to the number of planet gears. For operating, assembly, manufacturing, inspection, repair or replacement reasons, the axes and the frame can be separated into several parts.

For the same reasons previously mentioned, the toothing of a reduction gear can be separated into several impellers. In the example presented here, the reduction gear has several impellers with a ring gear separated into two half-rings:
  A front half-ring 9a consisting of a rim 9aa and of a fastening half-flange 9ab. The front impeller of the toothing of the reduction gear is located on the rim 9aa. This front impeller meshes with that of the plant gear 8 which meshes with that of the sun gear 7.
  A rear half-ring 9b consisting of a rim 9ba and of a fastening half-flange 9bb. The rear impeller of the toothing of the reduction gear is located on the rim 9ba. This rear impeller meshes with that of the planet gear 8 which meshes with that of the sun gear 7.

The fastening half-flange 9ab of the front ring gear 9a and the fastening half-flange 9bb of the rear ring gear 9b form the fastening flange 9c of the ring gear. The ring gear 9 is fastened to a ring gear carrier by assembling the fastening flange 9c of the ring gear and the fastening flange 12a of the ring gear carrier by means of a bolted assembly, for example.

The arrows of FIG. 2 describe the feeding of oil in the reduction gear 6. The oil arrives in the reduction gear 6 from the stator portion 5 into the distributor 13 by different means which will not be specified in this view because they are specific to one or more types of architecture. The distributor is generally separated into two portions each repeating the same number of planet gears. The injectors 13a have as their function to lubricate the toothing, and the arms 13b have as their function to lubricate the bearings. The oil is brought to the injector 13a to leave by the end 13c in order to lubricate the toothing. The oil is also brought to the arm 13b and circulates via the supply opening 13d of the bearing. The oil then circulates through the shaft into one or more buffer zones 10c to then leave by the openings 10d in order to lubricate the bearings of the planet gears.

In most applications like that presented in FIG. 2, the planet carrier is of the static type and is coupled to a fixed frame of the engine by a flexible element. Under these conditions, the components supported by the planet carrier (planetary gear trains, possible rolling-element bearings, etc.) are lubricated without difficulty via ducts fixed with respect to the engine frame and to the planet carrier.

In these cases, an oil transfer unit is generally provided to transfer lubricating oil effectively and reliably from a static portion to a rotating portion connected to the planet carrier. Such oil transfer units are generally called "oil transfer bearings" or "rotating couplers." The unit supplies oil under pressure into an annular chamber defined by a sleeve which is fastened to the satellite carrier. From this annular chamber, the oil under pressure flows to the components requiring lubrication.

In particular, certain applications such as variable pitch fans require a transfer of oil with a pressure on the order of 100 bars, which poses sealing problems.

In fact, current devices do not allow simply offering acceptable sealing for this type of pressure. The result is oil leaks which gradually alter the lubrication of the epicyclic gear train and reduce the lifetime of the assembly.

In this context, it is necessary to have an oil transfer device for lubricating a planet carrier of an epicyclic gear train, which allows oil transfer at high pressure while improving sealing and lifetime.

DISCLOSURE OF THE INVENTION

According to a first aspect, the invention proposes an oil transfer device for lubricating a planet carrier, movable in rotation, of an epicyclic gear train for a turbomachine, the device extending around an axis and having:
- an annular casing which extends around the axis, the casing comprising a plurality of oil feed grooves, axially juxtaposed, each having an oil ejection opening configured to lead radially to a lubrication circuit of the planet carrier to be lubricated. One of the oil feed grooves is a high-pressure oil feed groove, called a high-pressure groove, and another of the other oil feed grooves is a low-pressure oil feed groove, called a low-pressure groove, axially juxtaposed to the high-pressure groove, the grooves being axially arranged along the axis so that the oil can be transferred axially from the high-pressure groove to the low-pressure groove.

The device can comprise a high-pressure groove located axially between two low-pressure grooves.

The device can comprise means of guiding the device in rotation around the axis and the means of guiding in rotation can comprise at least one plain bearing which extends at right angles to a partition separating two axially juxtaposed grooves, to guide the device in rotation around the axis and to allow a transfer of oil from the high-pressure groove to the low-pressure groove along the plain bearing.

The lubrication circuit of the planet carrier can comprise at least one high-pressure supply channel arranged to be supplied with oil by a high-pressure groove, and at least one low-pressure oil supply channel arranged to be supplied with oil by a low-pressure groove.

The device can comprise a common high-pressure channel arranged to be supplied by several high-pressure grooves and/or a common low-pressure channel arranged to be supplied by several low-pressure grooves.

The device can comprise, for each groove, at least one principally radial oil ejection opening for feeding oil from said groove to the epicyclic gear train.

According to another aspect, the invention proposes a method of lubricating a planet carrier of an epicyclic gear train using a device according to the invention, comprising the followings steps:
- (a) injection of oil at high pressure into a high-pressure groove and injection of oil at low pressure into a low-pressure groove;
- (b) transfer of circulating oil from the high-pressure groove to the low-pressure groove axially juxtaposed to the high-pressure groove;
- (c) transfer of the oil circulating in the grooves to supply the planet carrier with oil.

Step (b) can comprise a step of passing the oil along a plain bearing for guiding the planet carrier in rotation.

According to another aspect, the invention proposes a turbomachine comprising at least one device according to the invention.

According to another aspect, the invention proposes an aircraft comprising at least one turbomachine according to the invention.

DESCRIPTION OF THE FIGURES

Other features, aims and advantages of the invention will be revealed by the description that follows, which is purely illustrative and not limiting, and which must be read with reference to the appended drawings, in which.

In all the figures, similar elements bear identical reference symbols.

DETAILED DESCRIPTION OF THE INVENTION

Architecture

Figure 1:
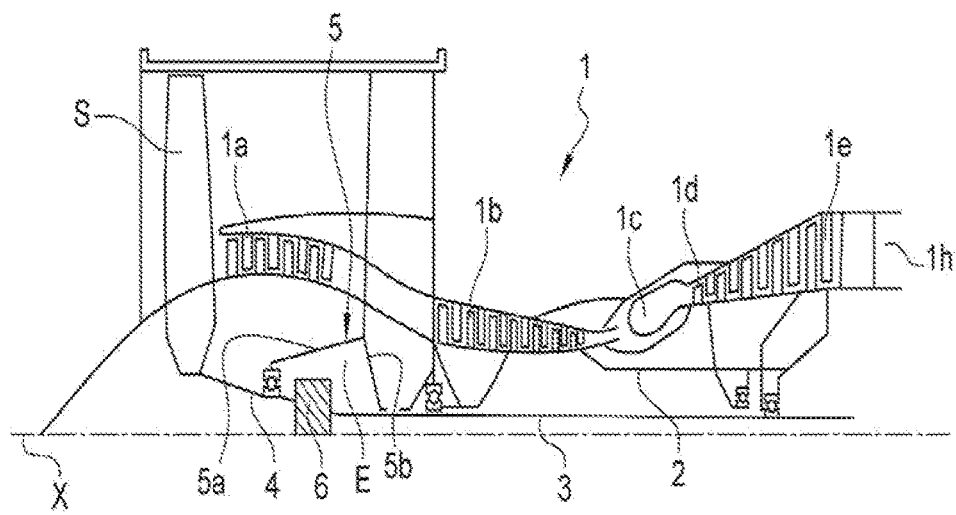
FIG. 1 is a partial section view of a turbomachine according to the prior art.
Figure 2:
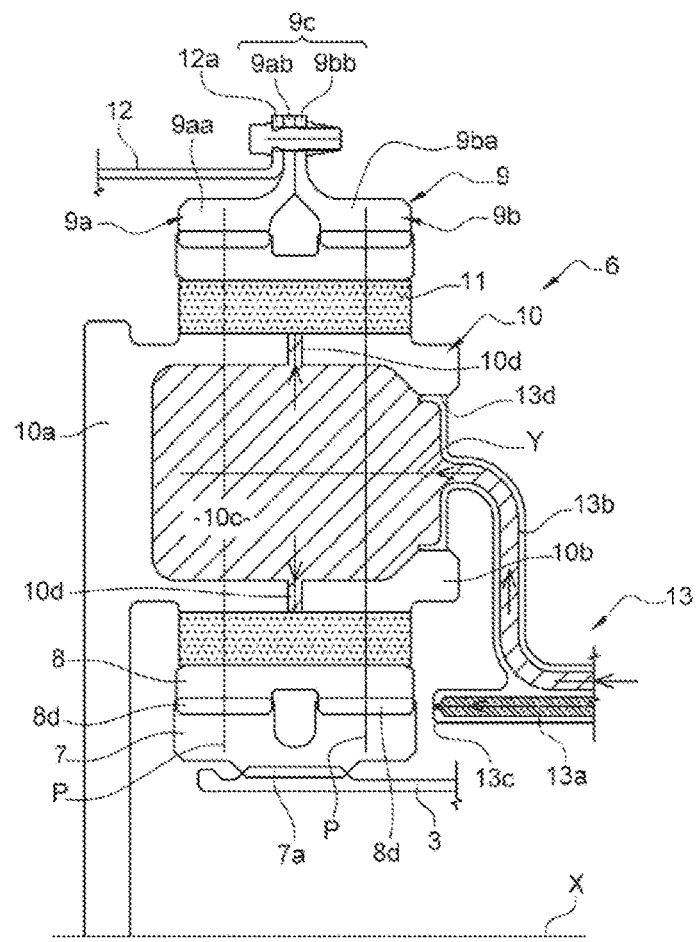
FIG. 2 is a section view of a reduction gear according to the prior art.
Figure 3:
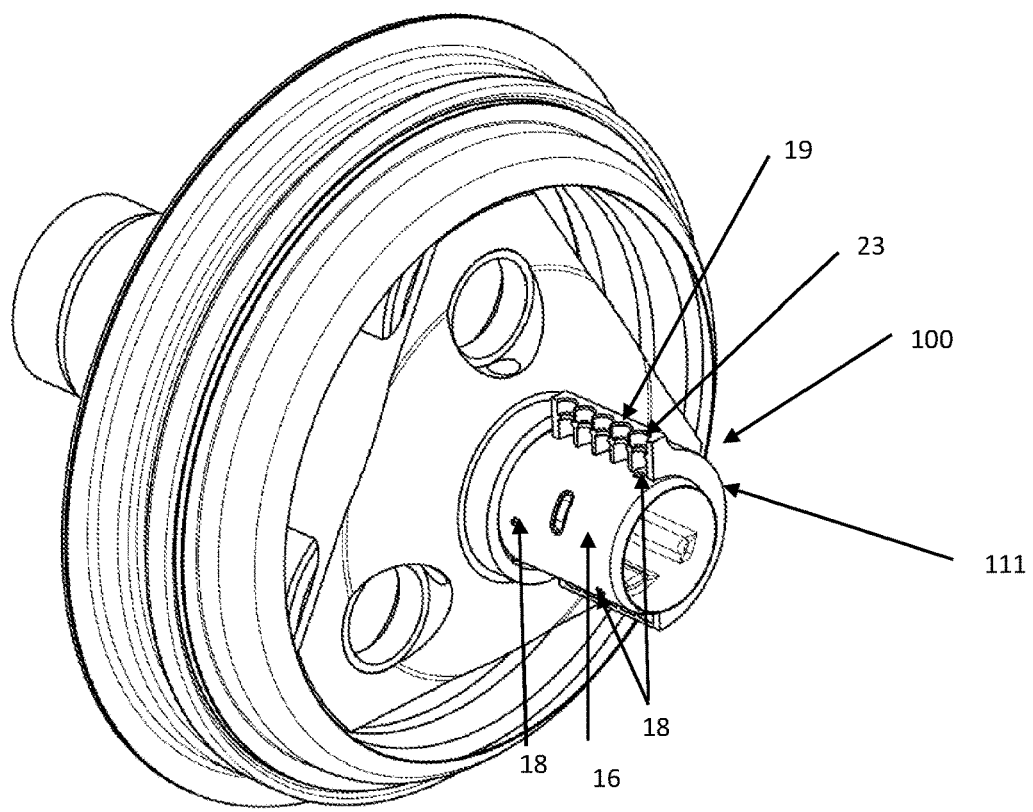
FIG. 3 is a perspective view, in partial section, of a device according to the invention positioned around an epicyclic gear train.
Figure 4:
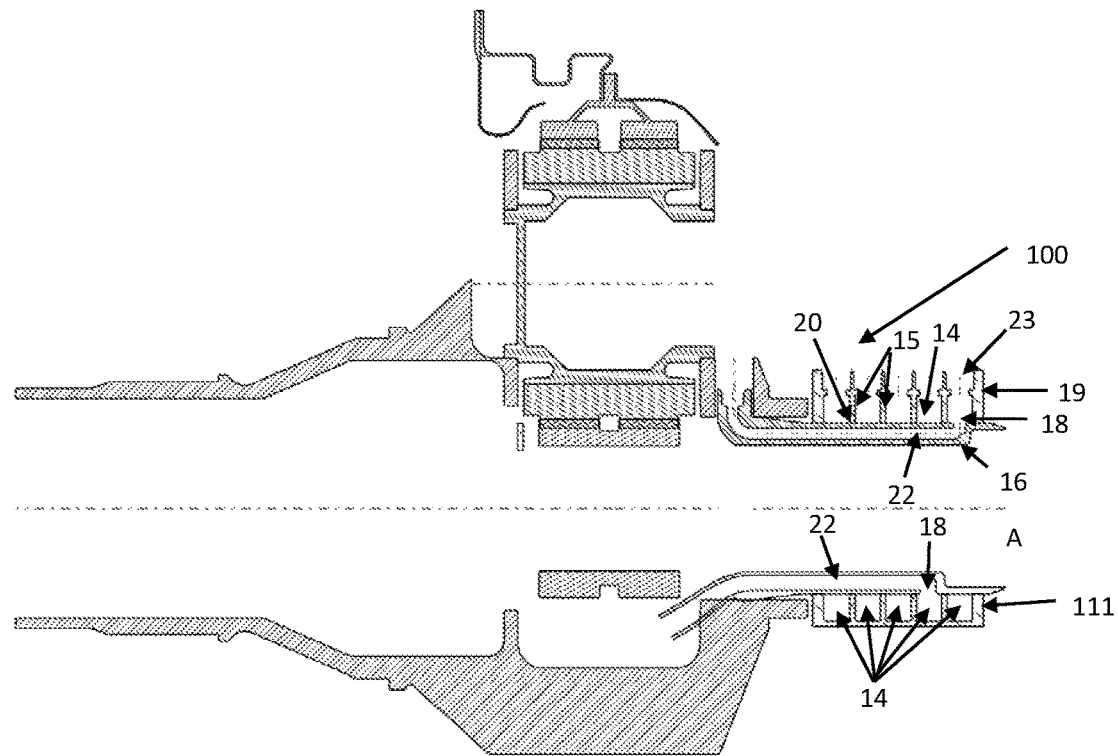
FIG. 4 is a section view of a device according to the invention positioned around an epicyclic gear train.

Generally, the invention relates to an oil transfer device 100 for lubricating a planet carrier of an epicyclic gear train for a turbomachine. In known fashion, an epicyclic gear train comprises a planetary gearing (i.e. a toothed wheel), in rotation around a longitudinal axis. One or more planet gears are designed to mesh with the planetary gearing. The entire gear train is positioned in a toothed ring gear, with interior teeth, called a planet carrier. The satellite carrier contains and meshes with the planet gears. The speeds of rotation of the different elements with respect to one another require lubrication. More particularly, in certain applications, it is necessary that this lubrication be accomplished at high pressure (i.e. a pressure greater than or equal to 100 bars).

The device 100 comprises an annular casing 111. Typically, the casing 111 can surround (via plain bearings 20 and an internal ring 16) a rotating shaft bearing a planetary gear train of the planet carrier.

Advantageously, the casing 111 can be an annular, axially symmetrical part, around an axis A.

Typically, in the operating condition, the axis A can coincide with the longitudinal axis of the satellite carrier.

The casing 111 can for example be obtained by molding a metal or a composite material, then reworked by machining.

The casing 111 has a plurality of grooves 14. The grooves define annular trenches in the casing 111, separated by partitions 15. The grooves 14 are oil feed grooves.

The grooves 14 are axially juxtaposed inside the casing 111. Thus, by passing through the casing 111 along the axis A, what are found successively and alternately are a groove 14, a partition 15, a groove 14, a partition 15, etc. In other words, the grooves 14 define a succession of annular subzones inside the casing 111.

The grooves 14 are a particularly advantageous technical arrangement of the invention, the function of which will be developed hereafter.

The casing 111 also has a plurality of ejection openings 23 for ejecting oil circulating in the grooves 14 toward the planet carrier to lubricate it.

According to the embodiments presented here, the ejection openings 23 are each positioned in a radial rib 19.

In addition, the device 100 comprises an internal ring 16 designed to directly surround a rotating shaft of the epicyclic gear train. The internal ring 16 has a plurality of supply channels 22, each allowing at least one groove 14 to be supplied with oil. Each channel 22 passes through the internal ring 16 and leads into at least one supply opening 18.

The internal ring 16 is free in rotation, around the axis A, relative to the casing 111. In fact, as will be developed hereafter, under operating conditions the internal ring 16 is mounted surrounding a planet carrier so that it rotates with the planet carrier. Although the casing 111 is substantially immobile or has a different speed of rotation from that of the internal ring 16.

The guiding in rotation of the internal ring 16 relative to the casing 111 is provided by a plurality of plain bearings 20. The plain bearings 20 are rings, each positioned between a partition 15 and the inner ring 16.

The plain bearings are a particularly advantageous arrangement of the invention which will be developed hereafter.

Arrangement and Operation of the Grooves

As previously stated, the device 100 comprises a plurality of grooves 14. The grooves 14 are designed to receive and feed oil.

According to a particularly advantageous technical provision, the device 100 comprises at least one groove 14a called a high-pressure groove, designed to receive oil under high pressure. The device 100 also comprises at least one groove 14b called a low-pressure groove, designed to receive oil under low pressure.

There can be a plurality of high-pressure grooves 14a and/or a plurality of low-pressure grooves 14b, and advantageously each groove 14 is a high-pressure groove 14a or a low-pressure groove 14b.

It will be understood that here the concepts of "low pressure" and "high pressure" are relative, so that the pressure of the oil received in a high-pressure groove 14a is always substantially higher than the pressure of the oil received in a low-pressure groove 14b.

It is specified that what is preferably meant by high pressure is oil at a minimum pressure of 80 bars and preferably at a pressure of 100 bars.

What is preferably meant by low pressure is oil at a maximum pressure of 80 bars and preferably at a pressure of 10 bars.

It is specified that the oil pressure is not necessarily identical in two high-pressure grooves 14a or in two low-pressure grooves 14b, but the relative pressure gap between two low-pressure grooves 14b or two high-pressure grooves 14a will always be substantially less than the relative gap between a low-pressure groove 14b and a high-pressure groove 14a (at least a factor of 10).

Thus, as will be developed hereafter, a low-pressure groove 14b comprised axially (along the axis A) between two high-pressure grooves 14a can have an oil pressure greater than the pressure of the oil circulating in a low-pressure groove 14b axially adjoining a single high-pressure groove. Nevertheless, in both cases, it is considered that low-pressure oil is present on the one hand and high-pressure oil on the other. In fact, the differential between high and low pressure is such that the pressure variations between several low-pressure grooves have no effect.

As previously indicated, the grooves 14 are axially juxtaposed. More precisely, each low-pressure groove 14b is alongside at least one high-pressure groove 14a. In other words, by passing through the device 100 along the axis A, what are found are at least one low-pressure groove 14b, then a partition 15, then a high-pressure groove 14a.

This arrangement, (one high-pressure groove 14a alongside a low-pressure groove 14b) is a base pattern of the invention. This pattern can be elaborated in different ways, of which a few examples are presented in the figures.

Figure 5:
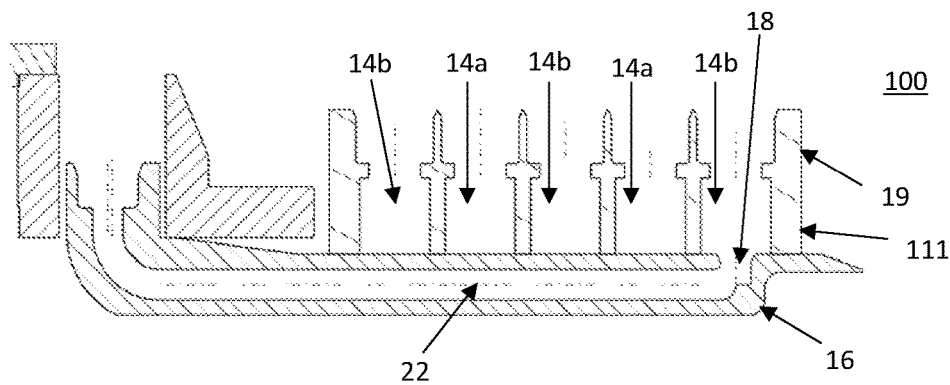
FIG. 5 is a perspective view, in section, of a device according to one embodiment of the invention.

Thus, as shown in FIG. 5, the device 100 can comprise two high-pressure grooves 14a each alongside two low-pressure grooves 14, for total number of five grooves. In other words, by passing through FIG. 5 from left to right along the axis A, a low-pressure groove 14b, a partition 15, a high-pressure groove 14a, a partition 15, a low-pressure groove 14b, a partition 15, a high-pressure groove 14a, a partition 15, a low-pressure groove 14b are found.

Figure 6:
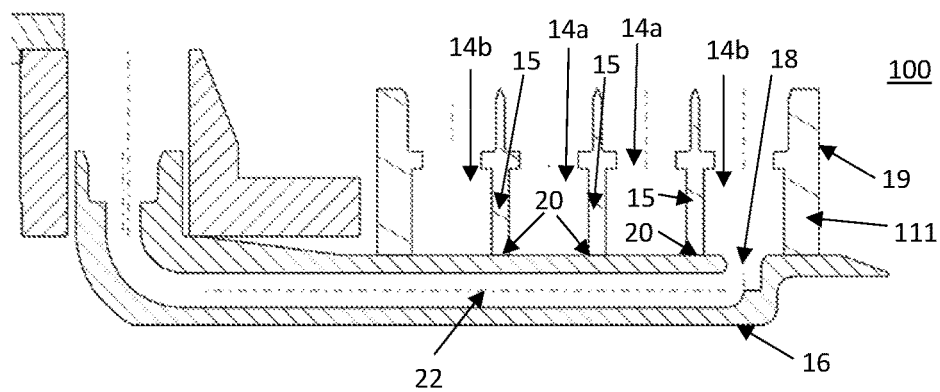
FIG. 6 is a partial section of a device according to one embodiment of the invention.
Figure 7:
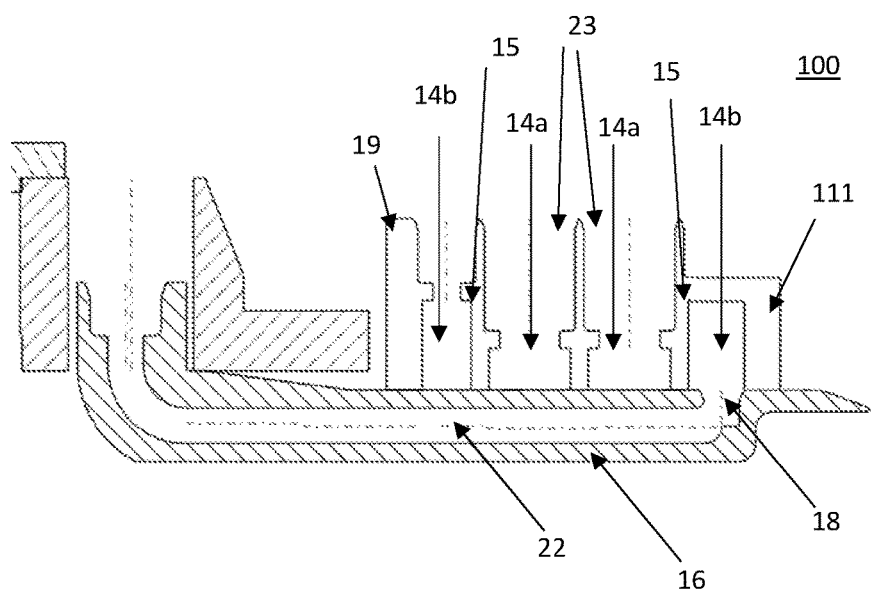
FIG. 7 is a partial section of a device according to one embodiment of the invention.
Figure 8:
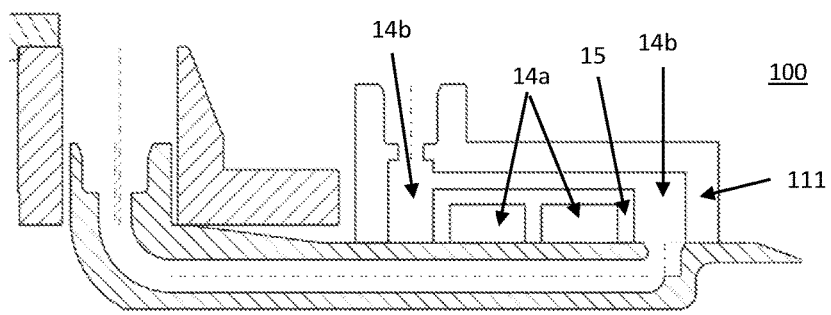
FIG. 8 is a partial section of a device according to the same embodiment as FIG. 5.
Figure 9:
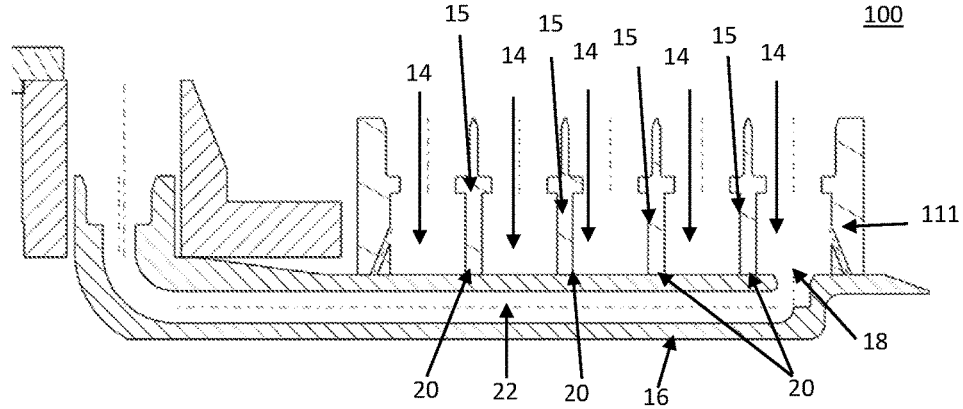
FIG. 9 is a partial section of a device according to an embodiment of the invention.
Figure 10:
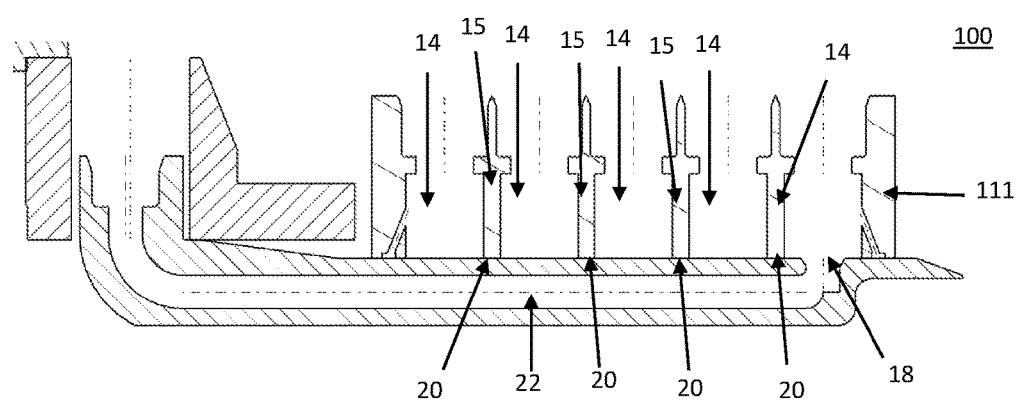
FIG. 10 is a partial section of a device according to one embodiment of the invention.
Figure 11:
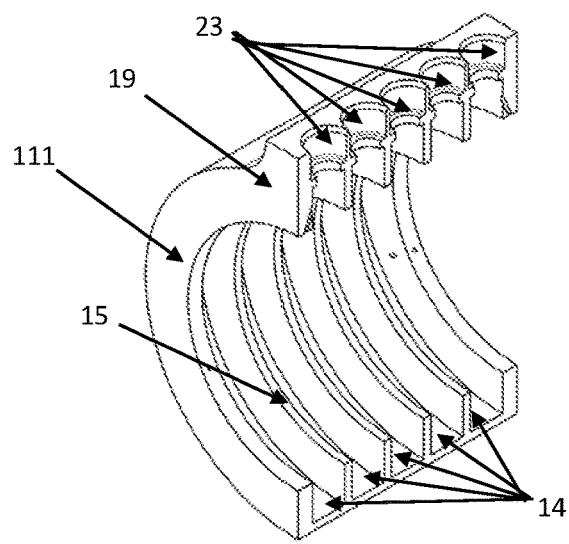
FIG. 11 is a perspective view, in section, of a device according to one embodiment of the invention.
Figure 12:
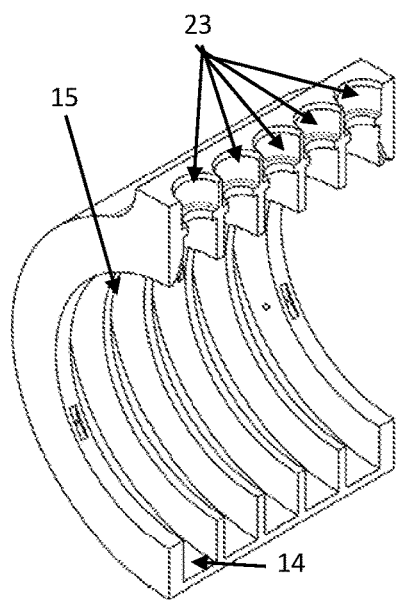
FIG. 12 is a perspective view, in section, of a device according to one embodiment of the invention.
Figure 13:
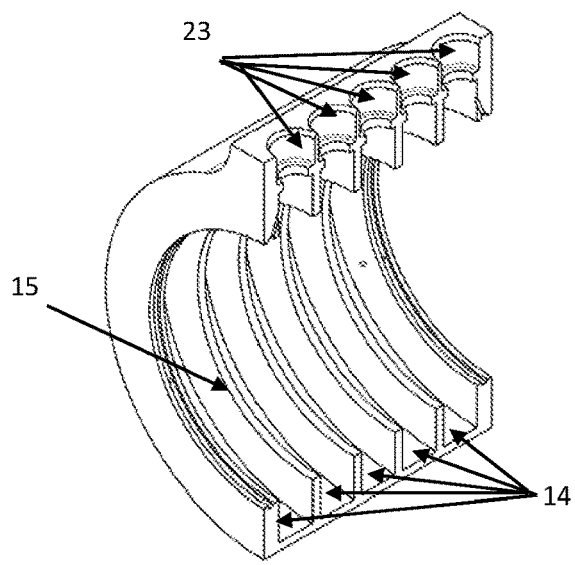
FIG. 13 is a partial section view of a device according to one embodiment of the invention.

According to the embodiment presented in FIGS. 6, 7, and 8, the device comprises two adjoining high-pressure grooves 14a, axially framed by two low-pressure grooves 14b. In other words, by passing through FIG. 6 from left to right along the axis A, a low-pressure groove 14b, a partition 15, a high-pressure groove 14a, a partition 15, a high-pressure groove 14a, a partition 15, a low-pressure groove 14b are found.

As will be described hereafter, the device 100 is designed so that oil can be transferred between two adjoining grooves 14.

Plain Bearings

As previously indicated, the inner ring 16 is in rotation relative to the casing 111. Guiding in rotation is accomplished by plain bearings 20. The plain bearings 20 are positioned in particular between the partitions 15 and the internal ring 16. In the figures, the plain bearings are not explicitly shown, reference symbol 20 indicating their placements. This is an illustrative simplification, a person skilled in the art being easily able to deduce the mounting of the plain bearings 20. The rules for mounting plain bearings (tight adjustment on one of the elements and clearance with the other element) and the nature of their constituting material allow a transfer of oil between two grooves 14.

More precisely, when a high oil pressure is applied axially on a plain bearing 20, in the context of assembly of the invention, the plain bearing 20 allows a small flow of oil to circulate axially. This is a particularly advantageous provision which will subsequently be detailed more specifically.

Supply Channels

Generally, each groove 14 is supplied with oil by a supply channel 22, and each channel can supply several grooves. As can be seen in the figures, the same supply channel can supply a single groove 14, or several grooves 14. Thus, with reference to FIGS. 7 and 8, the same supply channel 22 can supply two grooves 14, in this case the grooves 14 supplied by the same supply channel 22 are (isobaric) grooves 14 with the same pressure. In other words, the same supply channel 22 can be supplied by two high-pressure grooves 14a or two low-pressure grooves 14b. In addition, as shown in FIGS. 7 and 8, two grooves 14 which supply the same channel 22 can be axially adjoining or separated (i.e. one or more grooves 14 of different pressure being interposed axially between said two grooves 14 which supply the channel 22).

Operation

Under operating conditions, oil is injected into the channels 22. Thus, high-pressure oil is injected into the high-pressure grooves 14a and low-pressure oil is injected into the low-pressure grooves 14b and flows to the epicyclic gear train via the ejection openings 18 of the internal ring 16.

The pressure exerted by the oil in the high-pressure grooves 14a and on the plain bearings 20. When the pressure exceeds a certain threshold, the oil infiltrated into the plain bearing 20 and the partition 15 to flow into an adjoining low-pressure groove 14b. This particularly advantageous operation allows avoiding oil losses, these being recovered in the low-pressure grooves 14b.

It will be understood that when a low-pressure groove 14b is positioned between two high-pressure grooves 14a, it recovers oil originating in the two high-pressure grooves 14a and its pressure is increased as a result.

Thus, the pattern of a high-pressure groove 14a attached to a low-pressure groove 14b allows having high-pressure lubrication without losing oil and without having to implement complex dynamic sealing.

Method

According to another aspect, the invention relates to a method for lubricating a planet carrier of an epicyclic gear train using a device 100 according to the invention and comprising the following steps:

(a) injection of oil at high pressure into said at least one high-pressure groove 14a and injection of oil at low pressure into said at least one low-pressure groove 14b;

(b) transfer of circulating oil from said at least one high-pressure groove 14a to a low-pressure groove 14b juxtaposed to said at least one high-pressure groove 14a;

(c) transfer of the oil circulating in the grooves to supply the planet carrier with oil.

It will be understood that each of these "transfers" is accomplished automatically due to the pressure differentials and to the porosity of the plain bearings; no active means is involved.

According to an advantageous provision, step (b) thus comprises a step of the oil passing through a plain bearing 20.

Turbomachine and Aircraft

According to another aspect, the invention relates to a turbomachine comprising at least one device 100 according to the invention.

According to another aspect, the invention relates to an aircraft comprising at least one turbomachine comprising a device 100 according to the invention.

The invention claimed is:

1. An oil transfer device for lubricating a planet carrier, movable in rotation, of an epicyclic gear train for a turbomachine, the device extending around an axis and having:

an annular casing which extends around the axis, the casing comprising a plurality of oil feed grooves, axially juxtaposed, and a lubrication circuit comprising at least one lubrication channel arranged to lead oil supplied by at least one of the oil feed grooves to the planet carrier to be lubricated, wherein the oil feed grooves comprise at least one high-pressure oil feed groove, and at least one low-pressure oil feed groove, the oil feed grooves being configured to allow oil received in the at least one high-pressure groove to be at a pressure substantially higher than a pressure of oil received in the at least one low-pressure groove, the at least one high-pressure groove comprising at least one juxtaposed high-pressure groove that is axially juxtaposed to at least one juxtaposed low-pressure groove of the at least one low-pressure groove, the plurality of feed grooves being axially arranged along the axis so that oil can be transferred axially from the at least one juxtaposed high-pressure groove to the at least one juxtaposed low-pressure groove that is axially juxtaposed to the juxtaposed high-pressure groove, the device further comprising a ring coaxial with the annular casing and a guiding means for guiding the ring in rotation around the axis relatively to the casing, wherein the ring partially defines each of the oil feed grooves and the guiding means comprise at least one plain bearing which extends at right angles to a partition separating two axially juxtaposed grooves of the plurality of oil feed grooves, to guide the ring in rotation around the axis and to allow a transfer of oil along the plain bearing from the at least one juxtaposed high-pressure groove to the at least one juxtaposed low-pressure groove that is axially juxtaposed to the juxtaposed high-pressure groove.

2. The device according to claim 1, wherein the plurality of oil feed grooves comprise a plurality of the low-pressure grooves, the at least one high-pressure groove being located axially between two of the low-pressure grooves.

3. The device according to claim 1, wherein the lubrication circuit comprises at least one high-pressure supply channel arranged to be supplied with oil by the at least one high-pressure groove, and at least one low-pressure oil supply channel arranged to be supplied with oil by the at least one low-pressure groove.

4. The device according to claim 3, wherein the plurality of oil feed grooves comprise a plurality of the high-pressure grooves and the lubrication circuit comprises a common high-pressure channel arranged to be supplied by several of the high-pressure grooves and/or the plurality of oil feed grooves comprise a plurality of the low-pressure grooves and the lubrication circuit comprises a common low-pressure channel arranged to be supplied by several of the low-pressure grooves.

5. The device according to claim 3, wherein the at least one low-pressure oil supply channel consists of the at least one lubrication channel.

6. A turbomachine comprising at least one of the device according to claim 1.

7. An aircraft comprising at least one of the turbomachine according to claim 6.

8. The device according to claim 1, wherein the oil feed grooves are configured to allow a difference of at least 10 bars between the pressure of oil received in the at least one high-pressure groove and the pressure of oil received in the at least one low-pressure groove.

9. The device according to claim 1, wherein the planet carrier is movable in rotation relatively to the annular casing around the axis around which the device extends.

10. The device according to claim 1, wherein the lubrication circuit is movable in rotation relatively to the annular casing around the axis around which the device extends.

11. The device according to claim 1, wherein the at least one lubrication channel is part of the ring.

12. A method for using an oil transfer device for lubricating a planet carrier, movable in rotation, of an epicyclic gear train for a turbomachine, the device extending around an axis and having:
an annular casing which extends around the axis, the casing comprising a plurality of oil feed grooves, axially juxtaposed, and
a lubrication circuit comprising at least one lubrication channel arranged to lead oil supplied by at least one of the oil feed grooves to the planet carrier to be lubricated,
wherein the oil feed grooves comprise at least one high-pressure oil feed groove and at least one low-pressure oil feed groove, the oil feed grooves being configured to allow oil received in the at least one high-pressure groove to be at a pressure substantially higher than a pressure of oil received in the at least one low-pressure groove,
the at least one high-pressure groove comprising at least one juxtaposed high-pressure groove that is axially juxtaposed to at least one juxtaposed low-pressure groove of the at least one low-pressure groove, the plurality of feed grooves being axially arranged along the axis so that oil can be transferred axially from the at least one juxtaposed high-pressure groove to the at least one juxtaposed low-pressure groove that is axially juxtaposed to the juxtaposed high-pressure groove,
wherein the method comprises the following steps:
(a) injection of oil at high pressure into the at least one high-pressure groove and injection of oil at low pressure into the at least one low-pressure groove;
(b) transfer of circulating oil from the at least one juxtaposed high-pressure groove to the at least one juxtaposed low-pressure groove that is axially juxtaposed to the juxtaposed high-pressure groove;
(c) transfer of oil circulating in the plurality of oil feed grooves to the lubrication circuit so as to lubricate the planet carrier of the epicyclic gear train.

13. The method according to claim 12, wherein the step (b) comprises a step of passing oil along the plain bearing for guiding the planet carrier in rotation.

14. An oil transfer device for lubricating a planet carrier, movable in rotation, of an epicyclic gear train for a turbomachine, the device being centered on an axis and having:
an annular casing which extends around the axis, the casing comprising a plurality of oil feed grooves, axially juxtaposed, and
a lubrication circuit comprising at least one lubrication channel arranged to lead oil supplied by at least one of the oil feed grooves to the planet carrier to be lubricated,
wherein the oil feed grooves comprise at least one high-pressure oil feed groove and at least one low-pressure oil feed groove, the oil feed grooves being configured to allow oil received in the at least one high-pressure groove to be at a pressure substantially higher than a pressure of oil received in the at least one low-pressure groove,
the at least one high-pressure groove comprising at least one juxtaposed high-pressure groove that is axially juxtaposed to at least one juxtaposed low-pressure groove of the at least one low-pressure groove, the plurality of feed grooves being axially arranged along the axis so that oil can be transferred axially from the at least one juxtaposed high-pressure groove to the at least one juxtaposed low-pressure groove that is axially juxtaposed to the juxtaposed high-pressure groove,
wherein the planet carrier is movable in rotation relatively to the annular casing around the axis on which the device is centered.

15. The device according to claim 14, wherein the plurality of oil feed grooves comprise a plurality of the low-pressure grooves, the at least one high-pressure groove being located axially between two of the low-pressure grooves.

16. The device according to claim 14, wherein the lubrication circuit comprises at least one high-pressure supply channel arranged to be supplied with oil by the at least one high-pressure groove, and at least one low-pressure oil supply channel arranged to be supplied with oil by the at least one low-pressure groove.

17. The device according to claim 16, wherein the plurality of oil feed grooves comprise a plurality of the high-pressure grooves and the lubrication circuit comprises a common high-pressure channel arranged to be supplied by several of the high-pressure grooves and/or the plurality of oil feed grooves comprise a plurality of the low-pressure grooves and the lubrication circuit comprises a common low-pressure channel arranged to be supplied by several of the low-pressure grooves.

18. The device according to claim 16, wherein the at least one low-pressure oil supply channel consists of the at least one lubrication channel.

19. The device according to claim 14, wherein the oil feed grooves are configured to allow a difference of at least 10 bars between the pressure of oil received in the at least one high-pressure groove and the pressure of oil received in the at least one low-pressure groove.

20. The device according to claim 14, wherein the lubrication circuit is movable in rotation relatively to the annular casing around the axis on which the device is centered.

* * * * *